US007275244B1

(12) United States Patent
Charles Bell et al.

(10) Patent No.: US 7,275,244 B1
(45) Date of Patent: Sep. 25, 2007

(54) SYSTEM AND METHOD FOR INCREMENTALLY SAVING WEB FILES TO A WEB SERVER USING FILE HASH VALUES

(75) Inventors: Jeffrey Robert Charles Bell, Seattle, WA (US); Anil Kumar Yadav, Issaquah, WA (US); Hannah Wei Zhou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 10/392,109

(22) Filed: Mar. 18, 2003

(51) Int. Cl.
*G06F 9/44* (2006.01)
*G06F 9/45* (2006.01)
(52) U.S. Cl. .................. 717/168; 717/171; 717/175
(58) Field of Classification Search ........ 717/168–177; 709/203
See application file for complete search history.

(56) References Cited

U.S. PATENT DOCUMENTS

| | | | |
|---|---|---|---|
| 5,745,686 A * | 4/1998 | Saito et al. ................. 717/168 |
| 5,768,532 A * | 6/1998 | Megerian .................... 709/245 |
| 5,974,250 A * | 10/1999 | Angelo et al. ............... 713/100 |
| 6,049,671 A * | 4/2000 | Slivka et al. ............... 717/173 |
| 6,425,125 B1 * | 7/2002 | Fries et al. ................. 717/168 |
| 6,493,733 B1 * | 12/2002 | Pollack et al. .............. 715/513 |
| 6,493,871 B1 * | 12/2002 | McGuire et al. ............ 717/173 |
| 6,594,822 B1 * | 7/2003 | Schweitz et al. ........... 717/140 |
| 6,668,375 B1 * | 12/2003 | Leovac ....................... 717/174 |
| 6,738,970 B1 * | 5/2004 | Kruger et al. .............. 717/175 |
| 6,789,255 B1 * | 9/2004 | Pedrizetti et al. ........... 717/169 |
| 6,874,143 B1 * | 3/2005 | Murray et al. .............. 717/173 |
| 6,883,168 B1 * | 4/2005 | James et al. ................ 717/178 |
| 6,959,320 B2 * | 10/2005 | Shah et al. .................. 709/203 |
| 6,986,133 B2 * | 1/2006 | O'Brien et al. ............. 717/173 |
| 6,996,817 B2 * | 2/2006 | Birum et al. ................ 717/170 |
| 7,000,230 B1 * | 2/2006 | Murray et al. .............. 717/172 |
| 7,058,941 B1 * | 6/2006 | Venkatesan et al. ........ 717/168 |
| 7,124,408 B1 * | 10/2006 | Parthasarathy et al. ..... 717/170 |
| 7,167,914 B2 * | 1/2007 | Cohen et al. ............... 709/223 |
| 7,178,142 B2 * | 2/2007 | Bennett et al. ............. 717/168 |
| 7,185,015 B2 * | 2/2007 | Kester et al. ................ 707/10 |

OTHER PUBLICATIONS

Olken et al, "Ramdom sampling from hash files", ACM pp. 375-386, 1990.*
Gonnet et al, "External hashing with limited interanl storage", ACM Jor. of Asso. for Computing Machineary, vol. 35, No. 1, pp. 161-184, 1988.*
Ramakrishna et al, "File organization using composite perfect hashing", ACM Trans. of database system vol. 14, No. 2, pp. 231-263, 1989.*

(Continued)

*Primary Examiner*—Anil Khatri
(74) *Attorney, Agent, or Firm*—Perkins Coie LLP

(57) ABSTRACT

A web publishing application can generate and save web files to a web server based upon a user's design of a web page or web site. If the user subsequently modifies the web page or web site using the web publishing application, the web publishing application can identify and save only the new web files and modified web files to the web server that result from the user's modifications. For example, the web publishing application can identify which web files are new files and which web files have been modified by comparing the hash values and hash algorithms associated with the web files to the hash values and hash algorithms associated with the stored web files.

17 Claims, 6 Drawing Sheets

OTHER PUBLICATIONS

Rotem, "Clustered multiattribute hash files", ACM pp. 225-234, 1989.*
Schindelhauer et al, "Weighted distributed hash tables", ACM SPAAA, pp. 218-227, 2005.*
Chang, "Alternating hashing for expansible files", IEEE, TKDE, vol. 9, No. 1, pp. 179-185, 1997.*
Emmerik, "Identify library functions in executable file using patterns", IEEE SWEC, pp. 90-97, 1998.*
Chang et al, "Linear spiral hashing for expansible files", IEEE, TKDE, vil. 11, No. 6, pp. 969-984, 1999.*
Burkhard, "Hashing and trie algorithms for partial match retrieval", ACM Trans. Database Systems, vol. 1, No. 2, pp. 175-187.*
Litwin et al, "Linear hashing for distributed files", ACM SIGMOD, pp. 327-336, 1993.*

* cited by examiner

SYSTEM AND METHOD FOR INCREMENTALLY SAVING WEB FILES TO A WEB SERVER USING FILE HASH VALUES

FIELD OF THE INVENTION

The present invention is generally directed to the management of information on a computer, such as a server, over a communication network. More particularly described, the present invention supports the efficient updating of files on a server using file hash values.

BACKGROUND OF THE INVENTION

Since the widespread acceptance and use of the World Wide Web, software vendors have designed and developed software tools to allow computer users to author and publish web pages and web sites. These tools are sometimes conventionally referred to as "web publishing tools" or "web publishing applications."

In the conventional art, a sophisticated computer user typically uses a sophisticated web publishing application to design and publish a web page or web site. The skilled user is able to create web files, such as HTML files, which specify the design parameters of the web page. Once the user is ready to publish the web site on the Internet, the user manually selects and then uploads the web files to the web server, typically over a high speed network connection. If the user needs to revise the design or the content of the web site, the user simply revises the one or more web files affected by the revisions and uploads the modified web files to the web server.

Alternatively, if the sophisticated computer user needs to revise the web site, he or she may opt to edit certain web files directly on a server. In other words, the user identifies and selects which files need to be modified to effect the desired change, and edits the files directly on the server. However, there are several drawbacks to this approach. First, the user must identify which files must be modified to effect the desired change to the web site. While this may not be a difficult task for a skilled web site designer, it would be very difficult for an unsophisticated computer user to perform successfully. Additionally, if the one or more servers that stores the files is unavailable, the user will not be able to modify the files.

A less sophisticated computer user typically uses a basic web publishing application, such as a word processing application, that does not require him to know a programming language, such as HTML, in order to create a web page. For example, the user may use a basic web publishing application that allows the user to use design tools, such as wizards, design sets, or templates, to create a web site quickly and easily. Additionally, the user may use a word processing application to save a word processing document as a web file, such as an HTML file. Once the user is ready to publish the web site to the Internet, the web publishing application (or word processing application) automatically generates or creates the web files (such as HTML files) that are necessary to publish the web site.

The web publishing application then uploads the generated web files to the web server, typically over a low speed network connection (such as a dialup connection). If the user wants to revise the design or the content of the web site, the user simply revises and saves the document created in the web publishing application. Once the user is ready to publish the modified web site on the Internet, the web publishing application generates the web files for the web site and then typically uploads the generated web files to the web server.

One significant drawback to conventional basic web publishing applications, however, is that each time a user modifies the content or design of a web site, the web publishing application re-generates and uploads all of the web files for the web site, regardless of whether the web files were affected by the user's modifications. While this approach is a reliable way to ensure that all modified files are properly uploaded, if the web site comprises both text and images, the time it takes to upload the web files over the low-speed network connection can be significant.

Consequently, there is a need in the art for a system and method that allows an unskilled user to publish a modified web site to the Internet reliably and efficiently. Additionally, there is a need in the art for a system and method for automatically identifying which web files have been modified as a result of revisions made by a user to the design or content of a web site. Finally, there is a need in the art for a system and method for uploading modified web files to a web server without requiring the user to identify which web files have been modified.

SUMMARY OF THE INVENTION

The present invention can solve the aforementioned problems by identifying and saving to a computer new files and files that have been modified as a result of a user's modification of the files using a program module. More particularly described, the present invention can identify new files and files that have been affected by a user's revisions by comparing hash values associated with each file.

In one aspect of the present invention, a program module can use a hash algorithm to calculate a hash value for each file to be saved to a computer via a computer network. In order to determine whether a file should be saved to the computer, the program module can determine whether the file is already stored on the computer. If the file is not stored on the computer, then the program module can save the file to the computer. If the file is already stored on the computer, then the program module can determine whether the hash value associated with the file to be saved to the computer is different from the hash value associated with the stored file. If the hash values of the files are different, then the program module can save the file to the computer.

Various aspects of the present invention may be more clearly understood and appreciated from a review of the following detailed description of exemplary embodiments and by reference to the drawings and claims.

DETAILED DESCRIPTION OF EXEMPLARY EMBODIMENTS

Figure 1:
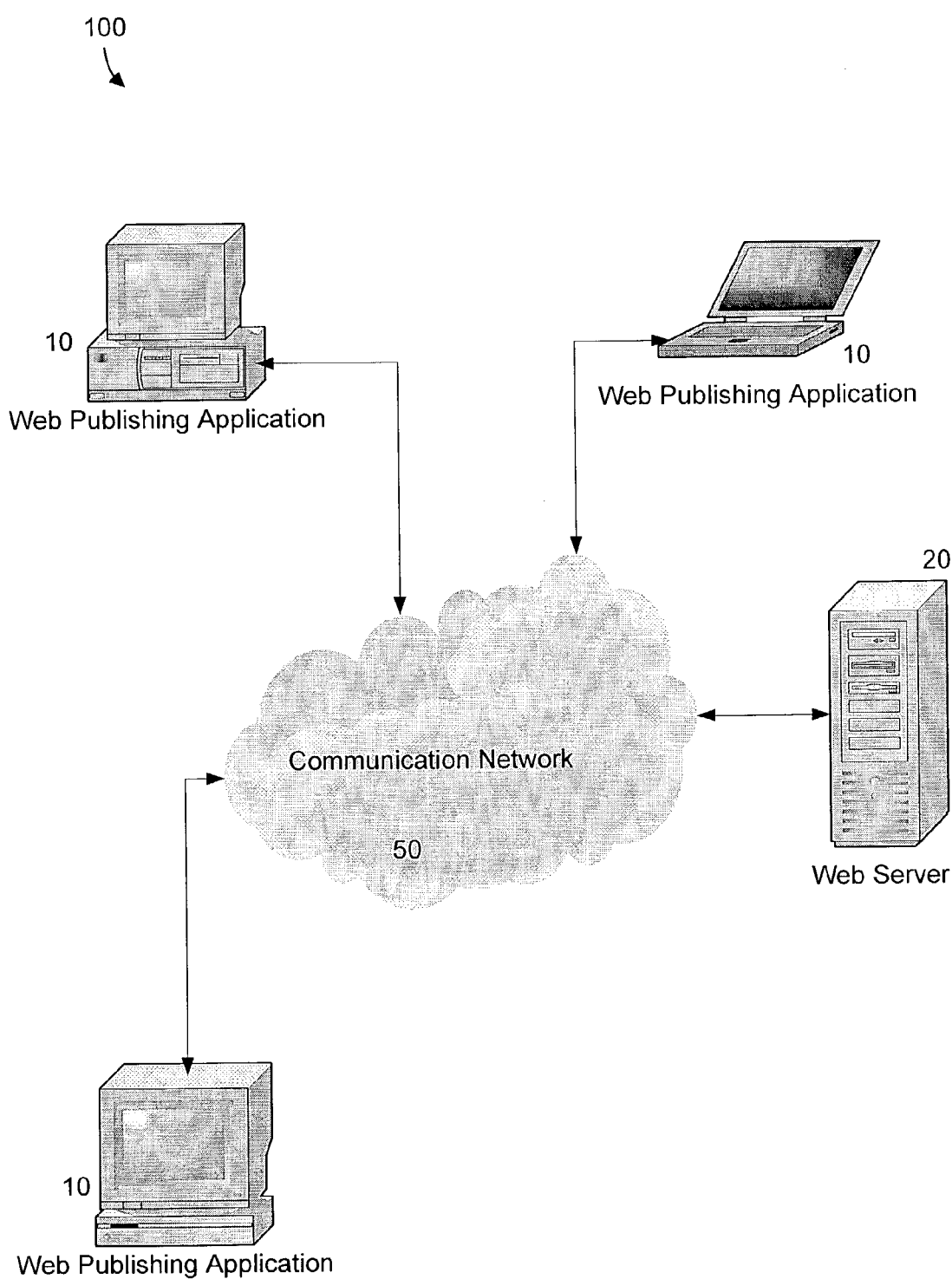
FIG. 1 illustrates components of an exemplary system for sending, receiving, and updating information across a communication network between an application and a server.

Illustrative embodiments of the present invention will be described. Although the illustrative embodiments will be generally described in the context of web publishing (i.e., designing, creating, and modifying web pages or web sites using a web publishing application, and uploading or saving web files associated with the web page or web site to a web server), those skilled in the art will recognize that the present invention may be implemented for any program module in which one or more files are saved or uploaded to a computer over a communication network. Additionally, although the illustrative embodiments will be generally described in the context of web publishing applications, those skilled in the art will recognize that the invention may be extended to a variety of types of program modules, including without limitation application programs.

An exemplary embodiment of the present invention allows a web publishing application to identify which web files associated with a web page or web site should be saved to a web server. If the web files have not been previously saved to the web server, the web publishing application can save all of the web files to the web server. On the other hand, if the web files have previously been saved to the web server, then the web publishing application can identify which web files should be saved to the web server. For example, the web publishing application can evaluate a hash value and hash algorithm associated with a web file to identify which web files have been affected by a user's subsequent modifications to the web page or web site in the web publishing application. Once the web publishing application has evaluated the hash value and hash algorithm associated with each web file and has identified which web files should be saved to the web server, the web publishing application can simply save those identified web files to the web server.

Referring now to the drawings in which like numerals represent like elements throughout the several figures, exemplary embodiments of the present invention and the illustrative operating environment will be described in connection with the drawings.

FIG. 1 illustrates components of an exemplary system 100 for sending, receiving, and updating information across a communication network 50 between an application and a server. In one exemplary embodiment, a web publishing application 10 saves web files associated with a web page or a web site to a web server 20 via a communication network 50, such as the Internet. Though individual components may be illustrated in the exemplary embodiment of FIG. 1, multiple components can be employed without departing from the scope and spirit of the present invention.

The system 100 comprises a web publishing application 10. The web publishing application 10 allows a computer user to design or create new web pages or web sites (or update or modify existing web pages or web sites) using a variety of web publishing tools, including, for example, wizards, templates, and design sets. Once the user has designed and created a particular web page, the web publishing application 10 generates one or more web files based upon the user's design of the web page. For example, the web publishing application 10 generates one or more HTML files based upon the user's design of his or her web page. These HTML files define how the web content authored by the user should be displayed to someone who accesses the web page over the Internet. The web publishing application 10 can generate a variety of types of web files that are associated with web pages or web sites, including without limitation .jpg files, .html files, .wav files, .xml files, .mpeg files, and .bmp files. Because the web publishing application 10 generates web files based upon the user's design of a particular web page or web site, the user can easily create or design web pages and web sites without having to actually write or modify HTML code or files or create any other web files.

For each web file generated by the web publishing application 10, the web publishing application 10 calculates a hash value using a hash algorithm (or "hash function") and associates the hash value and the hash algorithm with the web file. The exemplary web publishing application 10 uses the hash value and hash algorithm associated with each web file to determine whether the web file has been modified as a result of any subsequent modifications to the web page or web site by the user. The web publishing application 10 stores the hash value and an identifier identifying the hash algorithm associated with each web file in a data file.

In one exemplary embodiment of the present invention, the data file that associates the hash value and hash algorithm with each generated web file is named "cachedata.xml." The exemplary cachedata.xml file identifies the name of each web file generated by the web publishing application 10, the hash value associated with the web file, and the hash algorithm used to calculate the hash value for the web file.

As is understood by those skilled in the art, the web publishing application 10 can use any hash algorithm to calculate a hash value for a web file. The web publishing application 10 may opt to use a hash algorithm depending upon the file type of the web file. For example, the web publishing application 10 may use one hash algorithm for a .jpg file and another hash algorithm for an .htm file. In another exemplary embodiment, the web publishing application 10 may select a hash algorithm based upon the speed or efficiency of the algorithm in computing hash values. In yet another exemplary embodiment, the web publishing application 10 may select a reliable hash algorithm that does not produce a significant number of collisions, as is understood by those skilled in the art. Examples of hash algorithms comprise MD2, MD4, MD5, and the Secure Hash Algorithm (SHA). However, the invention is not limited to the use of these hash algorithms; any hash algorithm can be used by the web publishing application 10 to compute a hash value.

In yet another exemplary embodiment of the present invention, the web publishing application 10 uses the same hash algorithm for the generated web file as used to calculate the hash value for the stored web file, if the generated web file has previously been stored on the web server 20. More particularly described, the web publishing application 10 first reads the web server 20 to determine whether a cachedata.xml file is stored on the web server 20. If the cachedata.xml file is stored on the web server 20, the web publishing application 10 determines whether each generated web file is identified in the stored cachedata.xml file. If a generated web file is identified in the stored cachedata.xml file, the web publishing application 10 uses the hash algorithm identified in the stored cachedata.xml file to calculate the hash value for the generated web file. If the generated web file is not identified in the stored cachedata.xml file, then the web publishing application 10 uses any hash algorithm to calculate the hash value for the generated web file. By using the same hash algorithm to calculate a hash value for the web file, the web publishing application 10 is less likely to improperly identify the generated web file as having been modified. In other words, if the same hash algorithm is used for the generated web file as for the stored web file, then the generated web file will only be uploaded to the web server 20 when the hash values associated with each web file are not the same.

Once the user has completed his or her design of a web page, the user selects a save location to which the web page should be saved. In one exemplary embodiment, the user identifies the web server 20 on which the web page or web site should be stored. For example, the user may request that the web page be saved to myhost.com/user/default.htm. In this example, "default.htm" is the name of the HTML web file for the first or top-level web page of the web site.

Once the user has selected the save location, the web publishing application 10 generates a file that identifies by file name all of the web files that were generated by the web publishing application 10 for the web page. In one exemplary embodiment, the name of this file is "filelist.xml." The default.htm file specifies the location of the filelist.xml file and the cachedata.xml file at the save location.

The web publishing application 10 then saves the generated web files, including the default.htm file, the filelist.xml file, and the cachedata.xml file, to the save location specified by the user via the communication network 50. Once these files are stored on the web server 20, the web page or web site can be accessed by authorized computer users via the communication network 50.

If at a later time, the user desires to modify the web page or web site, the user simply uses the web publishing application 10 to modify the design or the content of the web page locally on his or her computer. For example, the user may desire to revise existing content or add new content to the web page, to modify the existing layout of the web page, to move images or animation, or to add additional pictures. Once the user has completed modifying the web page using the web publishing application 10, the web publishing application 10 generates local web files for the modified web page. For each web file generated by the web publishing application 10, the web publishing application 10 calculates a hash value using a hash algorithm and associates the hash value and the hash algorithm with the web file. The hash value uniquely identifies the content of the web file. The web publishing application 10 stores the hash value and an identifier identifying the hash algorithm associated with each web file in a local cachedata.xml file. The web publishing application 10 also generates a local filelist.xml file. The filelist.xml file lists the names of the web files generated for the modified web page.

The web publishing application 10 then saves to the save location new web files that were generated as a result of the user's modifications to the web page and web files that were modified or somehow affected as a result of the user's modifications to the web page. In other words, the web publishing application 10 identifies and saves to the web server 20 only those web files necessary to effect the changes or modifications made by the user to the web page.

In order to determine which web files are new web files and which web files were modified or affected by the user's modifications, the web publishing application 10 compares the web files stored on the web server 20 and the web files that were generated locally. More specifically, the web publishing application 10 compares the filelist.xml file stored at the save location with the local filelist.xml file. For each web file listed in the local filelist.xml file that is not listed in the stored filelist.xml file, the web publishing application 10 saves that web file to the save location. For each web file listed in the stored filelist.xml file that is not listed in the local filelist.xml file, the web publishing application 10 deletes the web file from the save location because it is no longer needed for the modified web page.

Additionally, for each local web file and stored web file with the same file name, the web publishing application 10 compares the hash value and hash algorithm associated with the local web file to the hash value and hash algorithm associated with the stored web file. If the hash value and the hash algorithm of the local web file and the stored web file are the same, then the web publishing application 10 will not overwrite the stored web file at the save location with the local web file. In other words, if the hash values and hash algorithms are the same, then the user's modifications to the web page in the web publishing application 10 did not modify or otherwise affect the content of the web file. Accordingly, the web publishing application 10 does not need to save the web file again to the save location.

On the other hand, if either the hash value or the hash algorithm of the local web file and the stored web file are not the same, then the web publishing application 10 overwrites the stored web file with the local web file at the save location. In other words, if either the hash value or the hash algorithm is not the same, then the user's modifications to the web page did modify or otherwise affect that particular web file, and the local web file must be saved to the save location.

Certain steps in the processes described below in FIGS. 2 through 6 must naturally precede others for the present invention to function as described. However, the present invention is not limited to the order of the steps described, if such order or sequence does not alter the functionality of the present invention. It is recognized that some steps may be performed before or after other steps without departing from the scope and spirit of the present invention.

Figure 2:
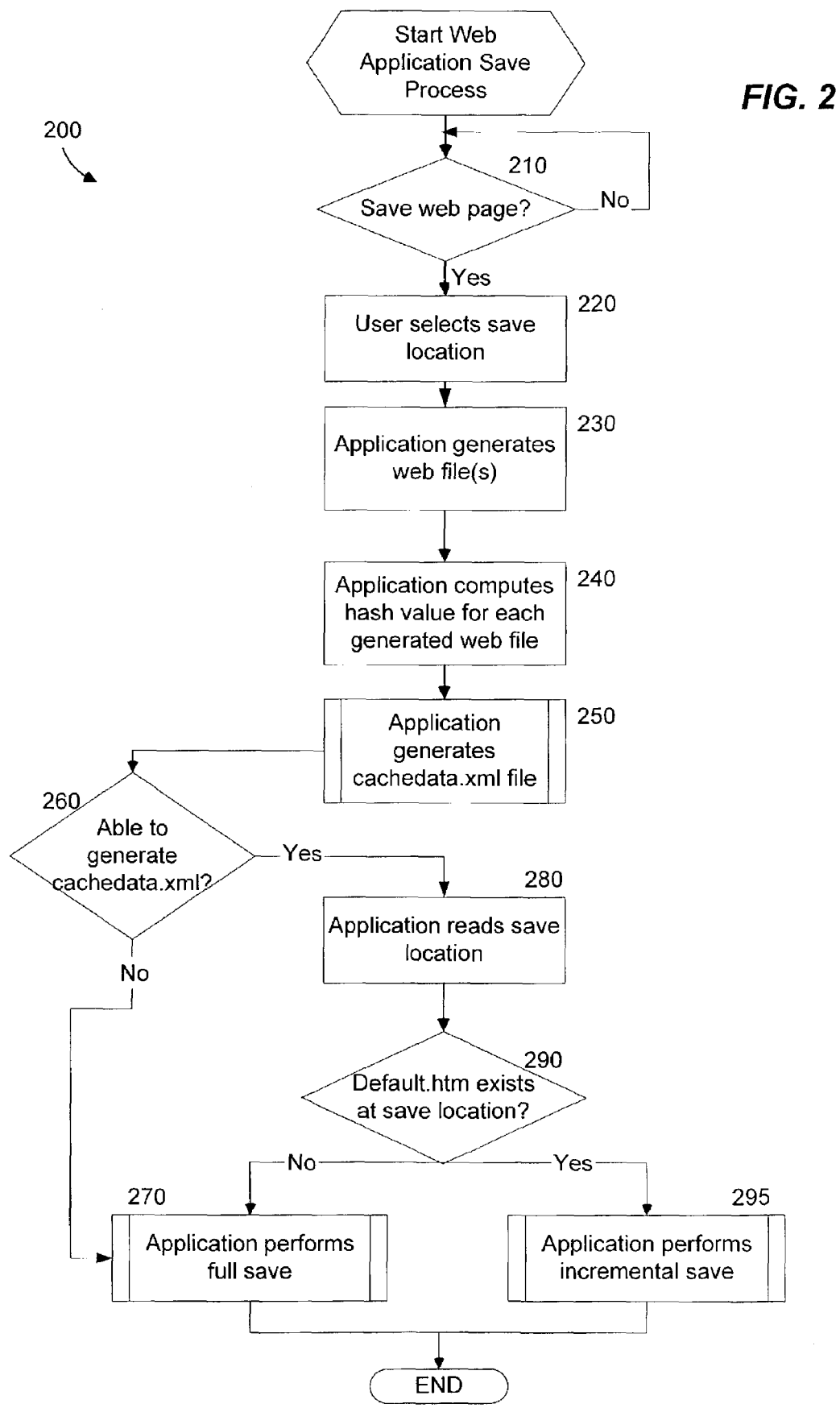
FIG. 2 is a logic flow diagram illustrating an exemplary process for saving web files to a web server from a web publishing application via a communication network.

FIG. 2 is a logic flow diagram illustrating an exemplary process 200 for saving web files to a web server 20 from a web publishing application 10 via a communication network 50. Step 210 is the first step in the exemplary process 200 of FIG. 2.

In Step 210, a program module, such as the web publishing application 10, determines whether the user of the web publishing application 10 desires to save one or more electronic files, such as a web page (or web site), to a remote computer, such as a web server 20. If the user has instructed the web publishing application 10 to save the web page to a web server 20, then in Step 220, the user identifies a save location to which the web page should be saved. In other words, the user identifies the web server 20 to which the web page (or web site) should be saved. For example, the user may request that the web page be saved to myhost.com/user/default.htm. As previously explained, in this example, "default.htm" is the name of the HTML web file for the first or top-level web page of the web site.

In Step 230, the web publishing application 10 generates one or more web files based upon the web page that the user has designed and created. The web files may comprise HTML files, .jpg files, .bmp files, .wav files, .xml files, mpeg files, and any other audio file, video file, or web file. Then, in Step 240, the web publishing application 10 uses a hash algorithm to calculate a hash value for each web file generated in Step 230. The web publishing application 10 may use different hash algorithms to calculate a hash value for each web file, or it may use the same hash algorithm for each web file.

In Step 250, the web publishing application 10 generates a data file to store the hash value and the hash algorithm associated with each of the generated web files. In one exemplary embodiment, the file is named "cachedata.xml." The cachedata.xml file is used by the web publishing application 10 to identify which web files have been modified as a result of the user's subsequent changes to a web page in the web publishing application 10.

In Step 260, if for some reason the web publishing application 10 is not able to generate a cachedata.xml file, then in Step 270, the web publishing application 10 performs a "full save" of any web files to the web server 20.

However, if in Step 260, the web publishing application 10 is able to generate a cachedata.xml file, then in Step 280, the web publishing application 10 reads the save location that was identified by the user in Step 220 to determine whether certain files are already stored at the save location.

In Step 290, upon reading the save location, the web publishing application 10 determines whether the default.htm file is stored at the save location. The default.htm file is the HTML web file for the first or top-level page of the web site and identifies where other web files associated with the web page are stored. For example, the default.htm file identifies where the filelist.xml file and the cachedata.xml file are stored at the save location.

If a default.htm file is not stored at the save location, then in Step 270, the web publishing application 10 performs a full save of all of the files associated with the user's web page to the save location. In other words, the web publishing application saves the default.htm file, the filelist.xml file, the cachedata.xml file, and all of the generated web files to the save location.

On the other hand, if the default.htm file is stored at the save location, then in Step 295, the web publishing application 10 performs an "incremental save" of the generated web files to the web server 20. In other words, the web publishing application 10 saves to the save location new web files that were generated as a result of the user's modifications to the web page and web files that were modified or somehow affected as a result of the user's modifications to the web page. The web publishing application 10 identifies and saves to the web server 20 only those web files necessary to effect the changes or modifications made by the user to the web page.

Figure 3:
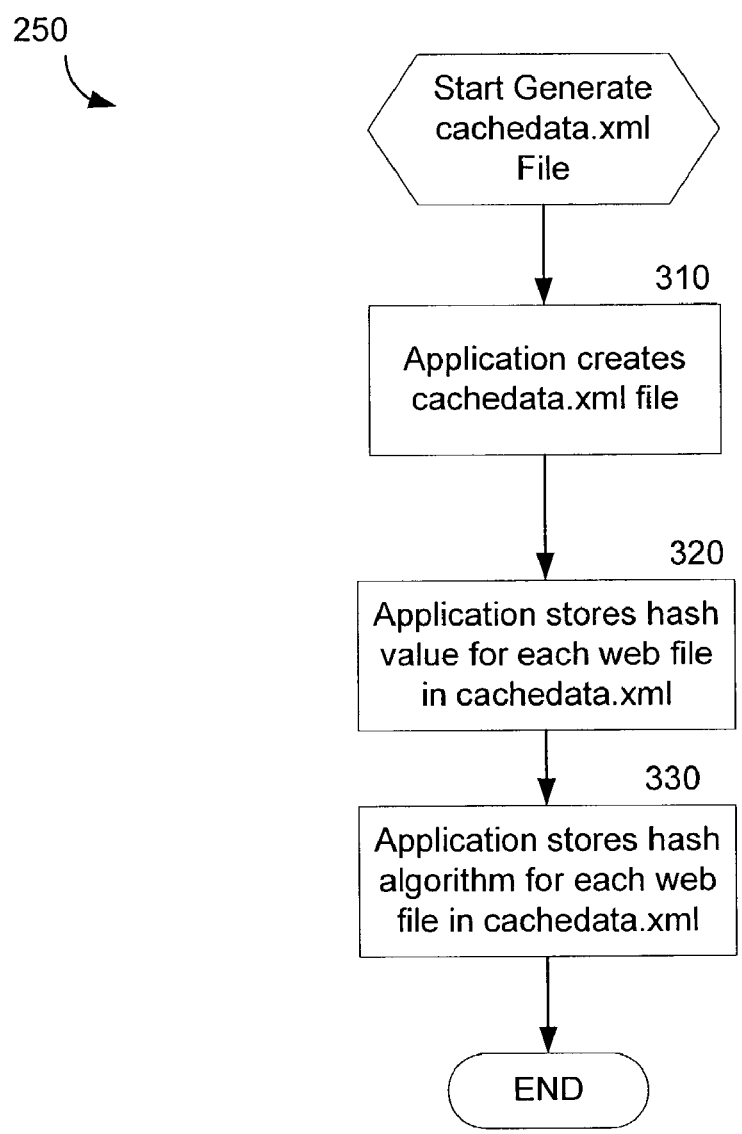
FIG. 3 is a logic flow diagram illustrating an exemplary sub-process or routine of FIG. 2 for generating a cache-data.xml file.

FIG. 3 is a logic flow diagram illustrating an exemplary sub-process or routine 250 of FIG. 2 for generating a cachedata.xml file. Step 310 is the first step in the exemplary process 250. In Step 310, the web publishing application 10 creates a file named cachedata.xml. In Step 320, the web publishing application 10 stores the hash value associated with each generated web file in the cachedata.xml file. In Step 330, the web publishing application 10 stores an identifier identifying the hash algorithm associated with each generated web file in the cachedata.xml file. In this way, in one exemplary embodiment, the cachedata.xml identifies each generated web file by file name, and for each web file, the cachedata.xml file identifies the hash value associated with the web file, and the hash algorithm used to calculate the hash value.

Figure 4:
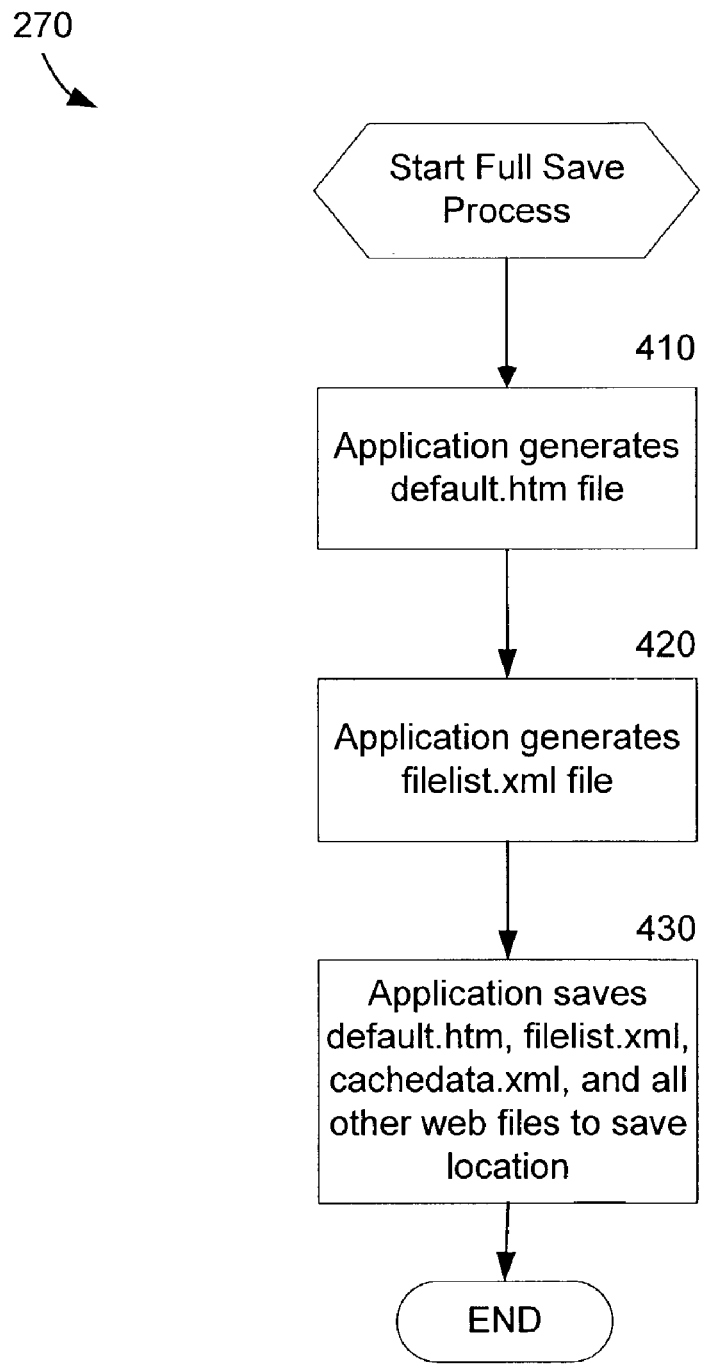
FIG. 4 is a logic flow diagram illustrating an exemplary sub-process or routine of FIG. 2 for performing a full save of the generated web files to a web server.

FIG. 4 is a logic flow diagram illustrating an exemplary sub-process or routine 270 of FIG. 2 for performing a full save of the generated web files to a web server 20. In other words, FIG. 4 illustrates a process 270 for saving all of the generated web files to the web server 20 via the communication network 50. Step 410 is the first step in the exemplary sub-process 270.

In Step 410, the web publishing application 10 creates the default.htm file. In Step 420, the web publishing application creates a filelist.xml file. The filelist.xml file lists the file name of each web file generated by the web publishing application 10. In Step 430, the web publishing application saves the default.htm file (which identifies the location of the filelist.xml file and the cachedata.xml file at the save location), the filelist.xml file (which lists the file names of the generated web files), the cachedata.xml file (which associates a hash value and hash algorithm with each web file) if the web publishing application 10 could create the cachedata.xml file, and all other generated web files to the save location via the communication network 50.

Figure 5:
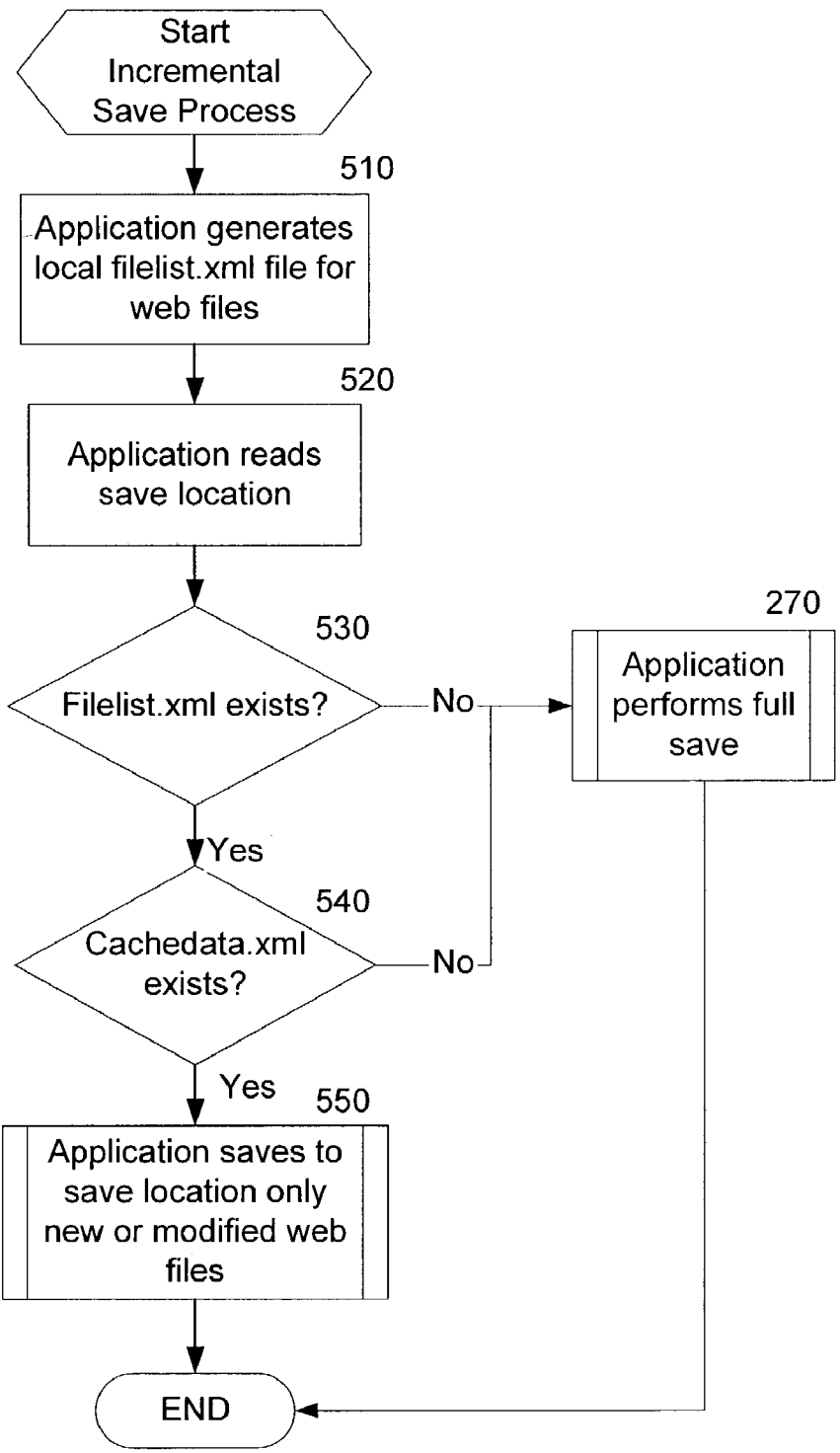
FIG. 5 is a logic flow diagram illustrating an exemplary sub-process or routine of FIG. 2 for performing an incremental save of web files to a web server via a communication network.

FIG. 5 is a logic flow diagram illustrating an exemplary sub-process or routine 295 of FIG. 2 for performing an incremental save of web files to a web server 20 via a communication network 50. More specifically, FIG. 5 illustrates a sub-process 295 for saving new web files or modified web files to a web server 20 that were generated or modified as a result of a user's subsequent changes to a web page. Step 510 is the first step in the exemplary sub-process 295.

In Step 510, the web publishing application 10 creates a local filelist.xml file, which identifies all the web files that were generated in Step 230. In Step 520, the web publishing application 10 reads the save location to which the modified web page is to be saved. In Step 530, the web publishing application 10 determines whether a filelist.xml file is stored on the web server 20. If a filelist.xml file is not stored on the web server 20, then in Step 270, the web publishing application 10 performs a full save of the web files to the web server 20.

If a filelist.xml file is stored on the web server 20, then in Step 540, the web publishing application 10 determines whether a cachedata.xml file is stored on the web server 20. If a cachedata.xml file is not stored on the web server 20, then in Step 270, the web publishing application 10 performs a full save of the web files to the web server 20. If a cachedata.xml file is stored on the web server 20, then in Step 550, the web publishing application 10 saves to the web server 20 only the new web files or the modified web files that resulted from the user's modifications to the web page in the web publishing application 10.

Figure 6:
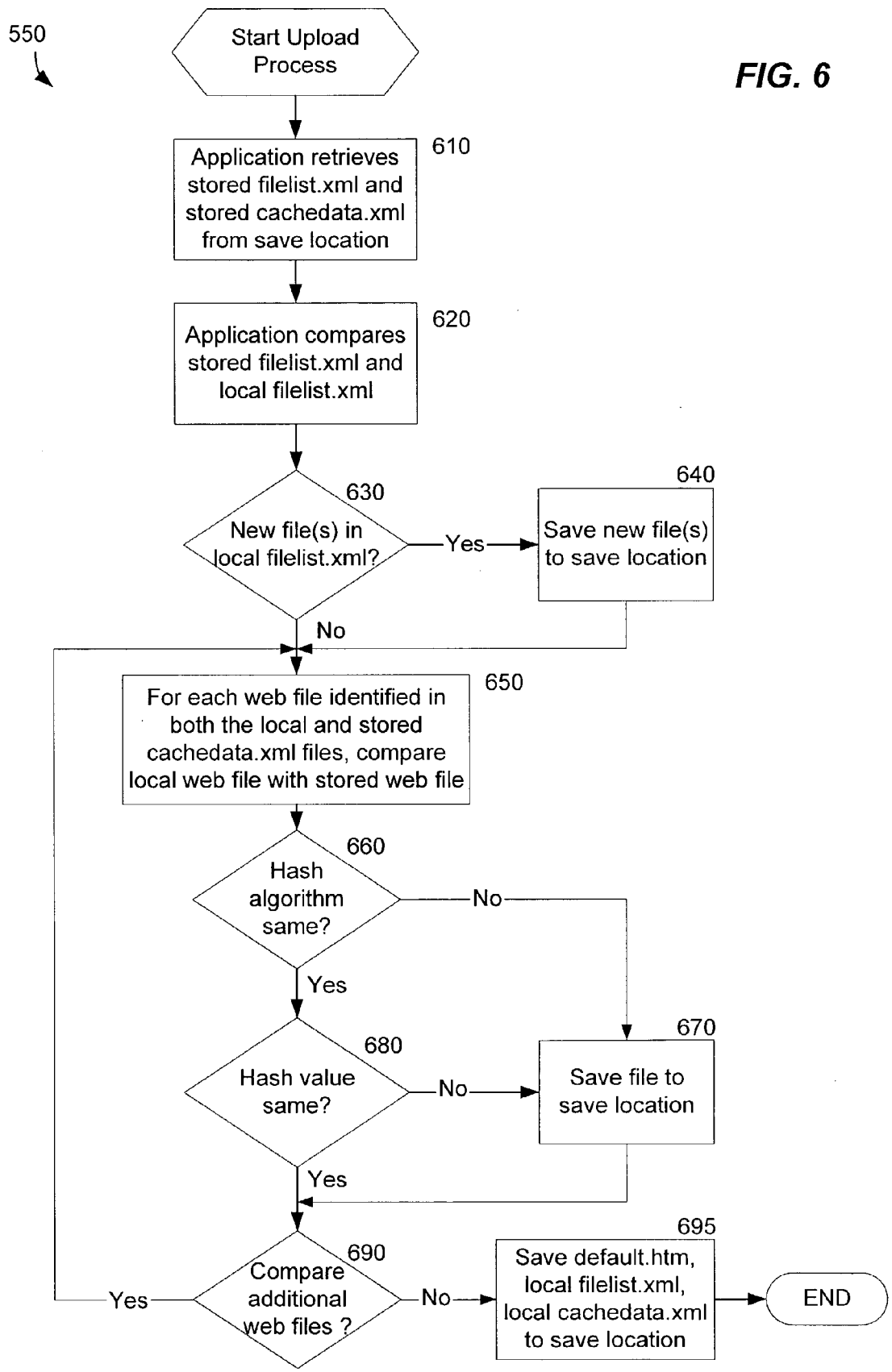
FIG. 6 is a logic flow diagram illustrating an exemplary sub-process or routine of FIG. 5 for saving only new or modified web files to a web server.

FIG. 6 is a logic flow diagram illustrating an exemplary sub-process or routine 550 of FIG. 5 for saving only new or modified web files to a web server 20. Step 610 is the first step in the exemplary sub-process 550.

In Step 610, the web publishing application 10 retrieves the stored filelist.xml file and the stored cachedata.xml file from the save location. In Step 620, the web publishing application 10 compares the stored filelist.xml file to the local filelist.xml file. In Step 630, the web publishing application 10 determines whether any new web files are listed in the local filelist.xml file that are not listed in the stored filelist.xml file. If one or more new web files are listed in the local filelist.xml file, then in Step 640, the web publishing application 10 saves those web files to the web server 20. In another exemplary embodiment, if there are web files listed in the stored filelist.xml file that are not listed in the local filelist.xml file, then the web publishing application 10 also deletes those particular web files from the web server 20.

In Step 650, for each web file identified in both the local cachedata.xml file and the stored cachedata.xml file, the web publishing application 10 compares the hash value and hash algorithm associated with the local web file to the hash value and hash algorithm associated with the stored web file. More specifically, in Step 660, the web publishing application 10 determines whether the hash algorithm associated with the local web file is the same as the hash algorithm associated with the stored web file. If the hash algorithms are not the same, then in Step 670, the web publishing application 10 saves the local web file to the web server 20.

If the hash algorithms are the same, then in Step 680, the web publishing application 10 determines whether the hash value associated with the local web file is the same as the hash value associated with the stored web file. If the hash values of the files are not the same, then in Step 670, the web publishing application 10 saves the local web file to the web server 20. However, if the hash values are the same (or once the web publishing application 10 saves the local web file to the web server 20 in Step 670), then in Step 690, the web publishing application 10 determines whether additional web files identified in both the local cachedata.xml file and the stored cachedata.xml file must be compared. If additional files are to be compared, then the process repeats at Step 650. If no additional web files are left to be compared, then in Step 695, the web publishing application 10 saves the local default.htm file, the local filelist.xml file, and the local cachedata.xml file to the web server 20 via the communication network 50.

Those skilled in the art will appreciate that the exemplary system 100 and method 200 allows an unskilled computer user to publish web pages or web sites to the Internet reliably and efficiently. For example, once a user updates or modifies a web page or web site in a web publishing application 10, the web publishing application 10 will attempt to save only new files and files that were affected by the user's modifications to a web server 20. The web publishing application 10 attempts not to unnecessarily save files to the web server 20 that were not affected by the user's modifications. Those skilled in the art will also recognize that the exemplary system 100 and method 200 allows the web publishing application 10 to identify which files are new files and which files have been modified as a result of the user's modifications by using and comparing hash values and hash algorithms associated with each file. Because the exemplary web publishing application 10 can compare the hash values and hash algorithms associated with a local file with the hash values and hash algorithms associated with a file stored on a web server 20, the user need not identify the files that have been modified or that need to be saved to the web server 20.

It should be understood that the foregoing relates only to illustrative embodiments of the present invention, and that numerous changes may be made therein without departing from the scope and spirit of the invention as defined by the following claims.

We claim:

1. A method for efficiently saving at least one of a plurality of electronic files to a computer coupled to a distributed computer network, each file having content and a file type, the computer being a server, comprising the steps of:

applying a hash algorithm depending upon the file type of the file to the content of the file to calculate a hash value for each electronic file, wherein the hash value represents the content of the electronic file such that the hash value changes when the user modifies the content of the file and a combination of hash value and hash algorithm is associated with the file; and for each electronic file,
determining if the electronic file is stored on the computer,
if the electronic file is not stored on the computer, saving the electronic file to the computer, and
if the electronic file is stored on the computer,
determining whether the combination of the hash value and the hash algorithm associated with the electronic file are different from the combination of the hash value and the hash algorithm associated with the electronic file stored on the computer, and
saving the electronic file to the computer when it is determined that the combinations of the hash value and the hash algorithm associated with the electronic files are different,
wherein the electronic file is not saved to the computer when it is determined that the combinations of the hash value and the hash algorithm associated with the electronic files are not different.

2. The method of claim 1, further comprising the step of generating a first file identifying each of the electronic files that are available to be saved to the computer.

3. The method of claim 2, wherein the step of determining if the electronic file is stored on the computer further comprises the steps of:

determining whether a second file that identifies each of the electronic files stored on the computer is maintained on the computer;
if the second file is maintained on the computer, then retrieving the second file from the computer; and
comparing the first file and the second file to determine which electronic files identified by the first file are not stored on the computer.

4. The method of claim 3, further comprising the step of saving the plurality of electronic files to the computer in the event that the second file is not maintained on the computer.

5. The method of claim 3, further comprising the steps of:
comparing the first file and the second file to determine which electronic files identified in the second file are not identified in the first file; and
deleting the electronic files that are only identified in the second file from the computer.

6. The method of claim 1, further comprising the step of generating a third file comprising the hash value and an identifier identifying the hash algorithm associated with each electronic file.

7. The method of claim 6, wherein the step of determining whether the hash value and hash algorithm associated with the electronic file are different, comprises the steps of:

determining whether a fourth file that identifies the hash algorithm and the hash value for each electronic file stored on the computer is maintained on the computer;
if the fourth file is maintained on the computer, then retrieving the fourth file from the computer; and
for each electronic file, comparing the hash value and the identifier of the hash algorithm in the third file with the hash value and hash algorithm identified by the fourth file.

8. The method of claim 7, further comprising the step of saving the plurality of electronic files to the computer in the event that the fourth file is not maintained on the computer.

9. The method of claim 1, wherein the step of saving the electronic file based upon the determination that the hash value and the hash algorithm associated with the electronic file are different, comprises the steps of:

for each electronic file,
saving the electronic file to the computer if the hash algorithm associated with the electronic file is different from the hash algorithm associated with the stored electronic file, and if the hash algorithm associated with the electronic file is the same as the hash algorithm associated with the stored electronic file, saving the electronic file to the computer if the hash value associated with the electronic file is different from the hash value associated with the stored electronic file.

10. A tangible computer-readable medium having computer-executable instructions for performing the steps recited in claim 1.

11. A method for uploading at least one modified web file of a plurality of web files to a web server, each file having content and a file type, comprising the steps of:

generating a first file by applying a hash algorithm to each web file to calculate a hash value, wherein the hash value represents the content of the web file such that the hash value changes when the file's content is modified, and storing the hash value and an identification of the hash algorithm for each web file in the first file;

generating a second file identifying the plurality of web files; and for each web file identified in the second file,
determining if the web file is stored on the web server,
if the web file is not stored on the web server, uploading the web file to the web server,
if the web file is stored on the web server, then obtaining a third file from the web server, wherein the third file identifies the hash value and the hash algorithm associated with the stored web file, and comparing the hash value and hash algorithm from the first file with the hash value and hash algorithm of the third file to determine if either the hash value or the hash algorithm of the web file is different from the hash value and the hash algorithm of the stored web file, and
if either the hash value or the hash algorithm of the web file is different from the hash value and hash algorithm of the stored web file, uploading the web file to the web server,
wherein the web file is not uploaded to the web server if the hash value and the hash algorithm of the web file is not different from the hash value and hash algorithm of the stored web file.

12. A computer-readable tangible medium having computer-executable instructions for performing the steps recited in claim 11.

13. The method of claim 11, wherein the determining if the web file is different from the stored web file comprises the step of determining if the hash algorithm associated with the web file is different from the hash algorithm associated with the stored web file.

14. The method of claim 11, wherein the determining if the web file is different from the stored web file comprises the step of determining if the hash value associated with the web file is different from the hash value associated with the stored web file.

15. A computer program resident on a tangible computer-readable medium of a first computer system coupled to a distributed computing network, the computer program operative to upload at least one of a plurality of files to a second computer system coupled to the network, each file having content and a file type operative to complete steps comprising:

for each file available to be uploaded to the second computer system,
applying a hash algorithm depending on the file type of the content of the file to calculate a hash value to be associated with the file, wherein the hash value represents the content of the file such that the hash value changes when the content of the file is changed,
associating the hash value with the file,
determining if the file is stored on the second computer system,
if the file is not stored on the second computer system uploading the file to the second computer system, and
if the file is stored on the second computer system, uploading the file to the second computer system if the hash value associated with the file is different from the hash value associated with the stored file on the second computer system,
wherein the file is not uploaded to the second computer system if the hash value associated with the file is not different from the hash value associated with the stored file on the second computer system.

16. The computer program of claim 15, operative to complete the calculating step by calculating the hash value using a hash algorithm and associating the hash algorithm with the file.

17. The computer program of claim 16, operative to complete the step of uploading the file to the second computer system, if the hash algorithm associated with the file is different from the hash algorithm associated with the stored file on the second computer system.

* * * * *